United States Patent
Bianco et al.

(10) Patent No.: US 9,686,416 B2
(45) Date of Patent: Jun. 20, 2017

(54) SYSTEMS AND METHODS FOR OUTGOING CALL REDIRECTION

(71) Applicant: VONAGE NETWORK LLC, Holmdel, NJ (US)

(72) Inventors: Itay Bianco, Tel-Aviv (IL); Sagie Machlin, Rishon Lezion (IL)

(73) Assignee: Vonage Business Inc., Atlanta, GA (US)

(*) Notice: Subject to any disclaimer, the term of this patent is extended or adjusted under 35 U.S.C. 154(b) by 66 days.

(21) Appl. No.: 14/577,212

(22) Filed: Dec. 19, 2014

(65) Prior Publication Data

US 2016/0182734 A1  Jun. 23, 2016

(51) Int. Cl.
*H04M 3/02* (2006.01)
*H04M 15/00* (2006.01)
*H04M 7/00* (2006.01)
*H04M 7/12* (2006.01)
*H04L 29/06* (2006.01)
*H04L 12/14* (2006.01)

(52) U.S. Cl.
CPC ........ *H04M 15/50* (2013.01); *H04L 12/1457* (2013.01); *H04L 12/1475* (2013.01); *H04L 65/1026* (2013.01); *H04L 65/1046* (2013.01); *H04L 65/1069* (2013.01); *H04L 65/1096* (2013.01); *H04M 7/006* (2013.01); *H04M 7/1205* (2013.01); *H04L 12/1446* (2013.01)

(58) Field of Classification Search
CPC combination set(s) only.
See application file for complete search history.

(56) References Cited

U.S. PATENT DOCUMENTS

2012/0263170 A1* 10/2012 Wang ................ H04M 3/42246
370/352
2013/0223436 A1*  8/2013 Efrati .................. H04L 65/1069
370/352

OTHER PUBLICATIONS

U.S. Appl. No. 14/524,429, filed Oct. 27, 2014, Efrati et al.

* cited by examiner

*Primary Examiner* — Joseph J Nguyen
(74) *Attorney, Agent, or Firm* — Moser Taboada; Joseph Pagnotta

(57) ABSTRACT

Systems and methods for redirecting calls are provided herein. In some embodiments, a method for redirecting calls may include receiving a first call request from a first user device via a first telephony service provider network to establish an off-net call with a second user device registered on a second telephony service provider network, determining that the first user device is associated with an account of the second telephony service provider network based on a communication identifier of the first user device included in the first call request, and sending a notification message to the first user device indicating that the off-net call may be established as an on-net call over the second telephony service provider network.

20 Claims, 8 Drawing Sheets

SYSTEMS AND METHODS FOR OUTGOING CALL REDIRECTION

BACKGROUND OF THE INVENTION

Field of the Invention

Embodiments of the present invention generally relate to call routing, and more specifically, to systems and methods for redirecting outgoing calls.

Description of the Related Art

Voice over IP (VoIP) is a technological development in the field of telecommunications that is utilized to establish and provide voice communications over a data network using the Internet Protocol (IP). Businesses and individuals implement VoIP by installing the necessary equipment and service (i.e., a "high speed" network or broadband connection) to access a VoIP service provider and activating this telecommunication service. Calls from a VoIP subscriber device to a destination device may be routed via a number of interconnected networks, such as via the VoIP service provider network, mobile telephone service provider networks, and existing and traditional telecommunications system more commonly referred to as the Public Switched Telephone Network (PSTN) or Plain Old Telephone Service (POTS).

VoIP service providers may provide mobile or desktop VoIP applications (apps) that users can install on their smartphone or other type of mobile or stationary computing devices, or may provide VoIP Telephone/Terminal Adaptors (TA) that can be used with traditional hardwire telephones. These VoIP enabled devices are referred to herein as VoIP devices. At least a portion of the call may be transmitted as packets over an IP network rather than over traditional mobile phone mobile communication technology standards. Traditional mobile phone mobile communication technology standards include Global System for Mobile Communications (GSM), Code division multiple access (CDMA), Universal Mobile Telecommunications System (UMTS), Long-Term Evolution (LTE), 3rd Generation Partnership Project 2 (3GPP2) standards, and the like. By transmitting voice as packet data over an IP network, these mobile apps can allow a user to make free or low-cost calls to domestic and international destinations. They may be used when the user is connected to a base station over the mobile operator's cell network, over a wireless local area network (WLAN) router, such as a WLAN router based on the Institute of Electrical and Electronics Engineers' (IEEE) 802.11x or 802.16x standards, and the like.

When a first VoIP device user makes a call directed to a second VoIP device user over an IP network, it may be referred to as an "on-net" or data based session call. In this case, the call is made entirely over IP networks using a WLAN for example. Thus, the VoIP provider does not typically pay termination costs normally associated with connecting a call to a recipient. It should be noted that while an "on-net" call may be nominally directed to a phone number associated with the recipient VoIP device, the actual destination is the IP address associated with the recipient's VoIP device.

Other times, a first VoIP device user may use the native dialer of the phone, or some other installed over-the-top (OTT) telecommunication application, to make a call directed to a second user which uses traditional mobile phone communication technology standards (e.g., GSM standards). A situation may arise where the second user is a subscriber of a VoIP telephony service provider. In this case, the outgoing leg of the call is transmitted via traditional mobile phone communication technology standards, while the terminating leg of the call is transmitted as voice packet data over an IP network. When either call-leg is not a VoIP leg, it is considered an "off-net" call, the cost of which is usually paid by the originator of the call, with fees that may be paid from the originating provider to the terminating provider. When each leg of a call is serviced by different telephony service provider networks, it is considered an "off-net" call, the cost of which is either passed down to the subscriber (generally, the originating caller) or is absorbed by one of the service provider networks. However, the originating caller could have equally made the same call as "on-net", for example, over a VoIP app installed on the originating device using an IP data network connection to avoid costs and using minutes.

Accordingly, there exists a need in the art for a method and system to notify users that outgoing calls initiated over a first telephony service provider network may be redirected over second telephony service network, and to redirect those calls accordingly.

SUMMARY OF THE INVENTION

Systems and methods for redirecting calls are provided herein. In some embodiments, a method for redirecting calls may include receiving a first call request from a first user device via a first telephony service provider network to establish an off-net call with a second user device registered on a second telephony service provider network, determining that the first user device is associated with an account of the second telephony service provider network based on a communication identifier of the first user device included in the first call request, and sending a notification message to the first user device indicating that the off-net call may be established as an on-net call over the second telephony service provider network.

In some embodiments, a computer-implemented method for redirecting an outgoing call includes sending, by a first user device, a first call request to establish an off-net call with a second user device, wherein the first call request includes communication identifiers of the first and second user devices, receiving a notification message indicating that the off-net call may be established as an on-net call based on the communication identifiers of the first and second user devices, and sending an on-net call request to establish the on-net call with the second user device.

In some embodiments, a system for redirecting calls may include a call processing system configured to receive a first call request from a first user device via a first telephony service provider network to establish an off-net call with a second user device registered on a second telephony service provider network, a subscriber database that stores user account information, a caller determination module communicatively coupled to the subscriber database and configured to determine whether the first user device is associated with an account of the second telephony service provider network based on a communication identifier of the first user device included in the first call request, and a notification module configured to send a notification message to the first user device indicating that the off-net call may be established as an on-net call over the second telephony service provider network.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
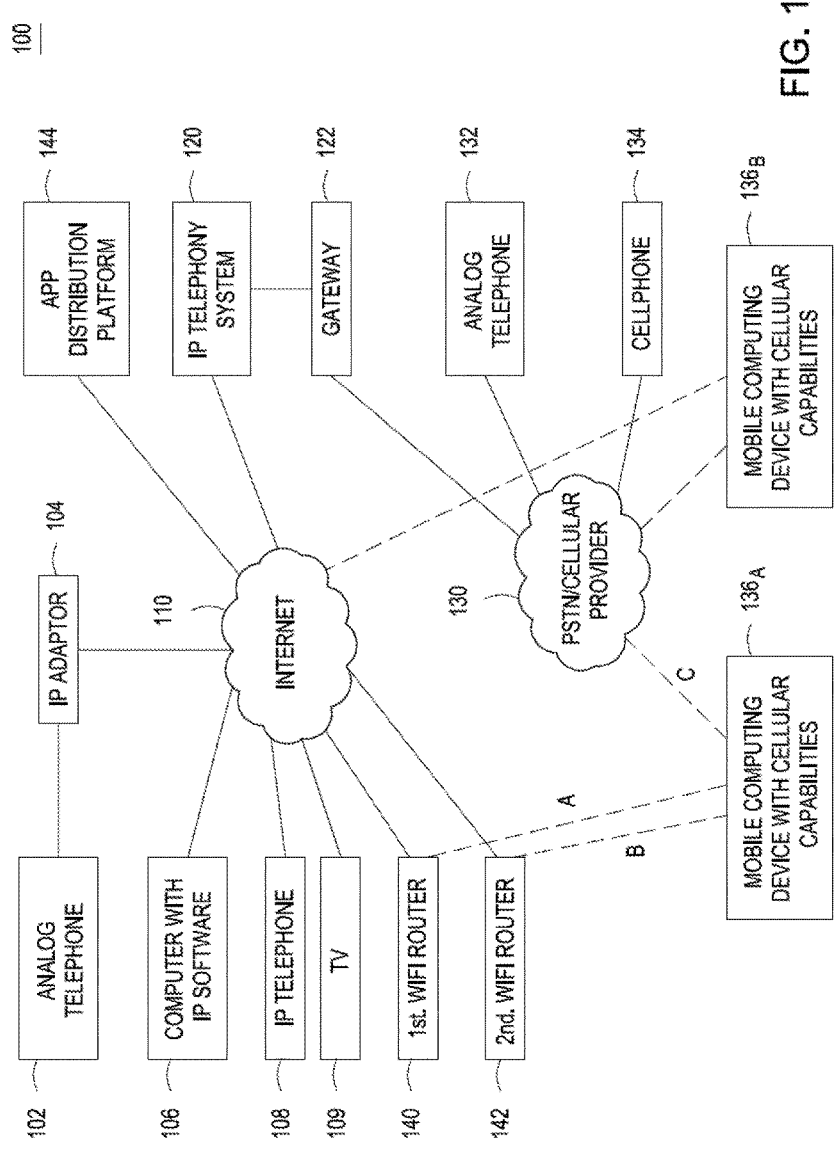
FIG. 1 is a diagram of a communication system in accordance with one or more exemplary embodiments of the invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention are directed to methods and systems for notifying users that outgoing calls initiated over a first telephony service provider network may be redirected over a second telephony service network, and to redirect those calls accordingly. Specifically, embodiments of the present invention may recognize that an incoming call from a cellular network (i.e., a call that is at least partially transmitted via traditional mobile phone mobile communication technology standards), or a PSTN network, to a VoIP service provider contact is from another VoIP service provider contact, in which case the VoIP service provider will notify the originating caller and attempt to redirect the caller from the cellular network call to a VoIP service provider call.

Upon receiving an incoming call request from an originating caller directed to a VoIP telephony subscriber, a caller identifier is extracted from the incoming call request to determine if the caller is also a VoIP telephony subscriber. If it is determined that the caller is a VoIP telephony subscriber, a notification message will be sent to the caller device indicating that the call can be made via the VoIP service provider network. The call may then be redirected, or otherwise established, over the VoIP telephony network based on the caller's response to the notification. In some embodiments, the call may automatically be redirected, or otherwise established, over the VoIP telephony network based on the caller device's settings.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Some exemplary embodiments described below are with respect to a mobile Voice over Internet Protocol (VOIP) telecommunication app. However, one skilled in the art will readily recognize from the following description that any application that relies on or uses address books/contact directories may be used in embodiments consistent with the present invention without departing from the principles of the disclosure described herein. For example, access to the cloud address book may be provided via a browser of a user device. When a contact is modified in the cloud address book, the change is further reflected on the user device where the contact is a native contact, and further synchronized with the "owner" of the contact, such as GOOGLE, YAHOO!, or Exchange.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a PSTN/cellular network 130 via a gateway 122. The PSTN/cellular network 130 may also be directly coupled to the Internet 110 through one of its own internal gateways (not shown). Thus, communications may pass back and forth between the IP telephony system 120 and the PSTN/cellular network 130 through the Internet 110 via a gateway maintained within the PSTN/cellular network 130.

The gateway 122 allows users and devices that are connected to the PSTN/cellular network 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to PSTN/cellular network 130 may call a customer of the IP telephony system 120. In this instance, the call is initially connected from the analog telephone 132 to the PSTN/cellular network 130, and then from the PSTN/cellular network 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN/cellular network 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a wireless local area network (WLAN) router based on the Institute of Electrical and Electronics Engineers' (IEEE) 802.11x or 802.16x standards. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as protocols based on (IEEE) 802.11x or 802.16x standards.

Similarly, mobile computing device with cellular capabilities 136B may also be coupled to internet 110 and/or cellular service provider 130. In some embodiments, mobile computing device 136B may be connected to internet 110 via a wireless local area network (WLAN) connection based on the Institute of Electrical and Electronics Engineers' (IEEE) 802.11x or 802.16x standards, and the like, and can also establish a VOIP telephone calls with the IP telephony system 120 similar to mobile computing device 136A. In embodiments of the present invention, communications environment 100 may be used to establish voice based or data based telecommunications sessions between mobile computing device 136A and mobile computing device 136B, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Figure 2:
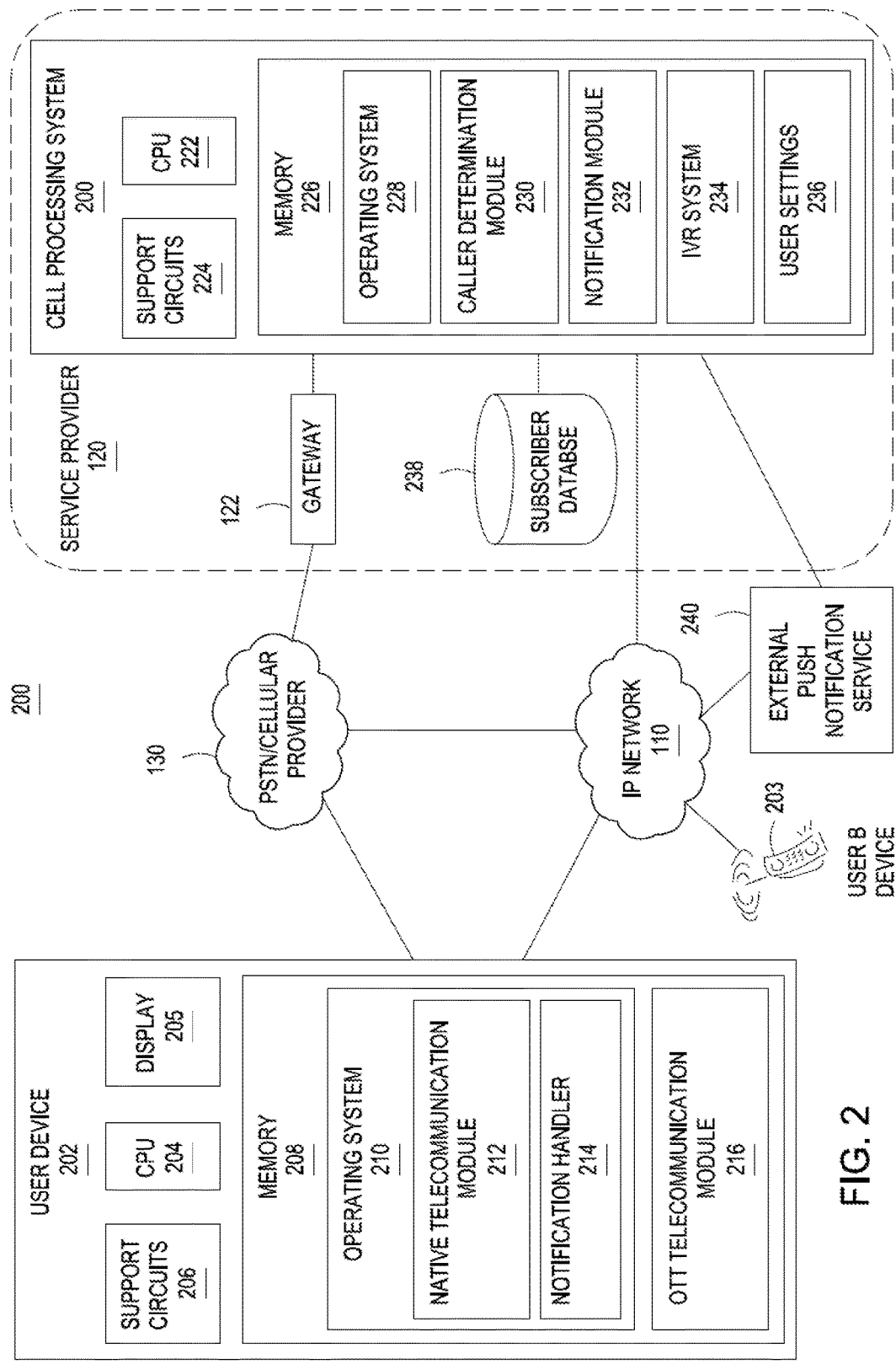
FIG. 2 is a detailed block diagram of a communication system for redirecting outgoing calls in accordance with one or more embodiments of the invention.

FIG. 2 depicts a block diagram of a system 200 for redirecting outgoing calls, according to one or more embodiments. The system 200 comprises multiple user devices, such as user devices 202 and 203, and IP telephony system 120 communicatively coupled via networks 110 and 130. In some embodiments, user devices 202 and 203 may be mobile computing devices (e.g., 136A, 136B, and the like) associated with a user, and IP telephony system 120 may be a VoIP telephony IP telephony system 120 as described above in FIG. 1.

Each user device 202 and 203 may comprise a Central Processing Unit (CPU) 204, display 205, support circuits 206, and memory 208. The CPU 204 may comprise one or more commercially available microprocessors or microcontrollers that facilitate data processing and storage. The various support circuits 206 facilitate the operation of the CPU 204 and include one or more clock circuits, power supplies, cache, input/output device and circuits, and the like. The memory 208 comprises at least one of Read Only Memory (ROM), Random Access Memory (RAM), disk drive storage, optical storage, removable storage and/or the like. In some embodiments, the memory 208 comprises an operating system 210, telecommunications module 212 including a native dialer, a notification handler 214 (e.g., a push notification handler, and an over-the-top (OTT) telecommunication module 216, such as a VoIP mobile app or VoIP mobile extension telecommunication app.

The operating system (OS) 210 generally manages various computer resources (e.g., network resources, file processors, and/or the like). The operating system 210 is configured to execute operations on one or more hardware and/or software modules, such as Network Interface Cards (NICs), hard disks, virtualization layers, firewalls and/or the like. Examples of the operating system 210 may include, but are not limited to, various versions of LINUX, MAC OSX, BSD, UNIX, MICROSOFT WINDOWS, IOS, ANDROID and the like. In some embodiments, operating system 210 may include an application programming interface (API) which can be used to access and user device information and features (such as, for example, by telecommunication module 216).

The native telecommunication module 212 may be used to facilitate, and otherwise provide, communication services such as, for example, GSM voice calling, CDMA voice calling, or various other types of communication services provided by a PSTN/Cellular service provider 130 (e.g., using traditional mobile phone mobile communication technology standards).

In some embodiments, the telecommunication module 216 may be a mobile VoIP app that provides VoIP telephony services to an end-user. For example, in some embodiments, telecommunication module 216 may be a mobile extension application installed on each user device 202 and 203 that can associate (e.g., link/charge) outgoing and/or incoming calls made from user devices 202 and 203 to the same VoIP telephony account. In some embodiments, an end-user may download the telecommunication module 216 from IP telephony system 120, or from an app distribution system 144, and install the telecommunication module 216 on their device.

In some embodiments, IP telephony system 120 may be a communication service provider, such as a VoIP service provider, that includes a call processing system 220 for processing call requests. In other embodiments, call processing system 220 may be a separate entity that provides call processing services to IP telephony system 120, or to individual users, by agreement. The call processing system 220 may include a Central Processing Unit (CPU) 222, support circuits 224, and memory 226. The CPU 222 may comprise one or more commercially available microprocessors or microcontrollers that facilitate data processing and storage. The various support circuits 224 facilitate the operation of the CPU 222 and include one or more clock circuits, power supplies, cache, input/output circuits, and the like. The memory 226 comprises at least one of Read Only Memory (ROM), Random Access Memory (RAM), disk drive storage, optical storage, removable storage and/or the like. In some embodiments, the memory 226 comprises an operating system 228, caller determination module 230, notification module 232, interactive voice recognition (IVR) system 234, and user settings 236. The operating system (OS) 228 generally manages various computer resources (e.g., network resources, file processors, and/or the like). The operating system 228 is configured to execute operations on one or more hardware and/or software modules, such as Network Interface Cards (NICs), hard disks, virtualization layers, firewalls and/or the like. Examples of the operating system 228 may include, but are not limited to, various versions of LINUX, MAC OSX, BSD, UNIX, MICROSOFT WINDOWS, IOS, ANDROID and the like.

The IP telephony system 120 includes a subscriber database 238. The subscriber database 238 maintains information about all subscribers, such as for example, identification information, account information, device information, associated communication identifiers (e.g., telephone numbers and/or other identifiers), and the like.

In general, when a cellular call from a first user device is placed to a second user device located on an IP telephony service network associated with IP telephony system 120, the IP telephony system 120 will determine if the originating caller is also an IP telephony service subscriber. If the originating caller is also an IP telephony service subscriber, the IP telephony system 120 can try to redirect the originating caller to use the IP service provider network to carry the inbound leg of the call instead of the cellular network. More specifically, the operation of system 200 will be discussed with respect to the methods 300, 350 and 400 depicted in signaling diagrams of FIGS. 3A, 3B, and 4, respectively, in accordance with one or more embodiments of the invention.

Figure 3A:
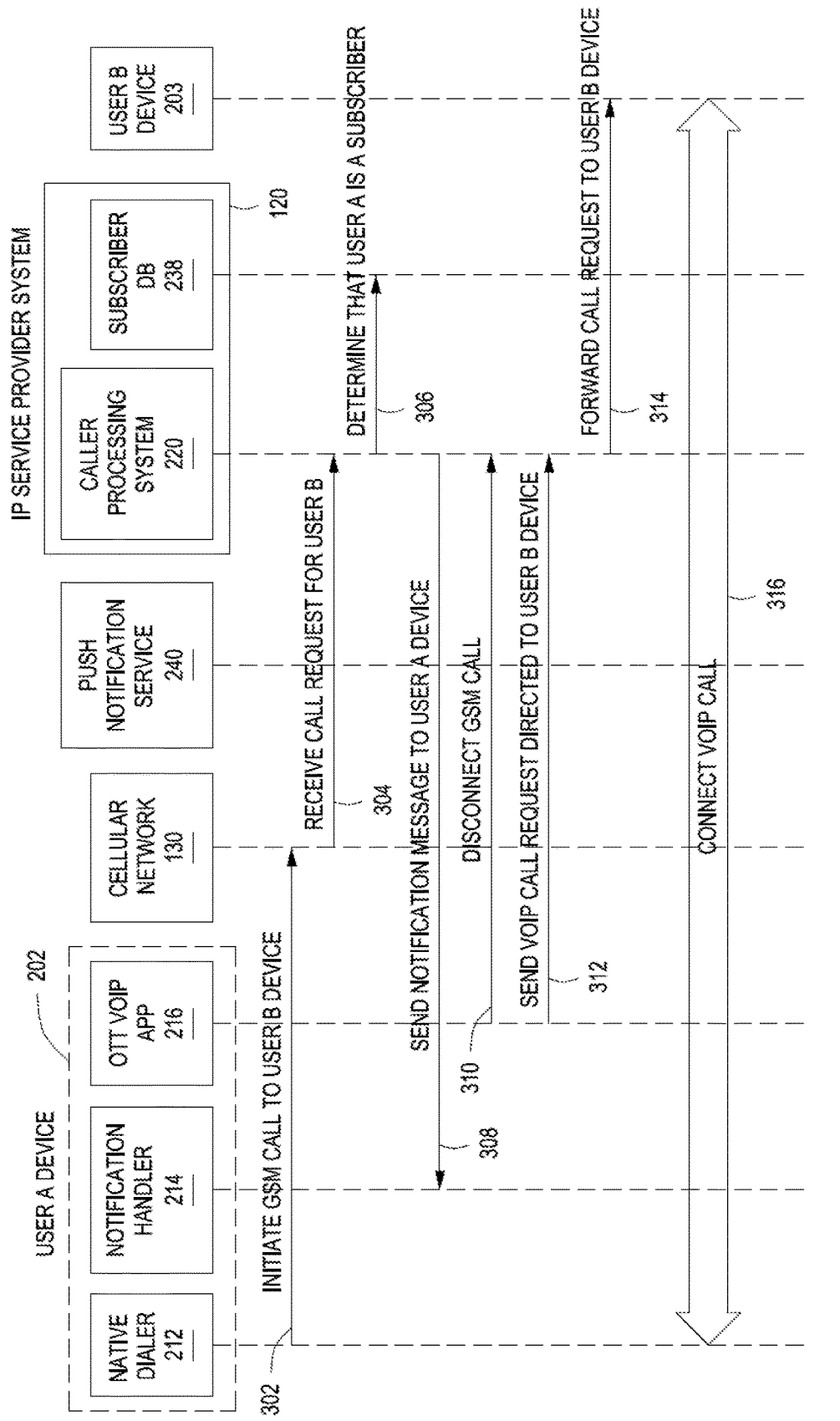
FIGS. 3A and 3B are flow diagrams of exemplary methods for redirecting outgoing calls in accordance with one or more embodiments of the invention.

In FIG. 3A, the method 300 begins at 302 where user A initiates a cellular call or PSTN call from user A device 202 that is directed to user B device 203. In some embodiments, the cellular call may be a GSM call, CDMA call, UMTS call, LTE call, and the like. User A may initiate the call using a native dialer as part of the native telecommunication module 212 associated with operating system 210 on user A device 202. In some embodiments, the telecommunication module 212 may not be provided by or part of the operating system 210, but rather may be a standalone OTT mobile app installed on user A device 202 that can provide cellular telecommunication services. When a cellular call is made using telecommunication module 212, cellular call is initially handled/processed by cellular network 130.

At 304, cellular network 130 forwards the call request to the IP telephony system 120 via gateway 122 since user B device 203 is located on an IP telephony service network associated with IP telephony system 120. In some embodiments, the call request received by the call processing system 220 may be a session initiation protocol (SIP) message, such as a SIP INVITE. The details and functionality of SIP can be found in the Internet Engineering Task Force (IETF) Request for Comments (RFC) Paper No. 3261 entitled, "SIP: Session Initiation Protocol," that is herein incorporated in its entirety by reference. In some embodiments, the call request received by call processing system 220 may be a signaling message including a H.323 message, Extensible Messaging and Presence Protocol (XMPP) message, or any other type of signaling message. The call processing system 220 receives and processes the call request directed to user B device 203.

At 306, the caller determination module 230 of the call processing system 220 will access subscriber database 238 to determine whether user A is an IP telephony service subscriber. In some embodiments, the caller determination module 230 may first extract a communication identifier associated with user A (or user A device 202) from a "FROM:" field, or similar field identifying the calling party (i.e., user A), located in the call request. In some embodiments, the communication identifier may be a telephone number associated with user A, or user A device 202.

The caller determination module 230 will use the extracted communication identifier from the call request as a lookup key in subscriber database 238 to determine if user A is an IP telephony service subscriber. If, at 306, it is determined that user A is not an IP telephony service subscriber (e.g., a match or partial match of the communication identifier is not found in subscriber database 238), the call will be completed between user A device 202 and user B device 203 as an "off-net" cellular call.

If, at 306, it is determined that user A is an IP telephony service subscriber associated with IP telephony system 120 (e.g., a match or partial match of the communication identifier is found in subscriber database 238 that indicates a telephony account for user A exists), the method 300 proceeds to 308 where a notification module 232 of call processing system 220 will send a notification message to user A device 202. In some embodiments, the notification message may be an SIP message. When an SIP message is sent as the notification message, the SIP message sent may include user B's device 203 information which will enable user A to establish an on-net VoIP call to user B's device 203. For example, the SIP message may include one or more or user B's phone number, an IP Telephony Service contact ID, and account ID, an IP address, or other type of communication identifier.

Figure 3B:
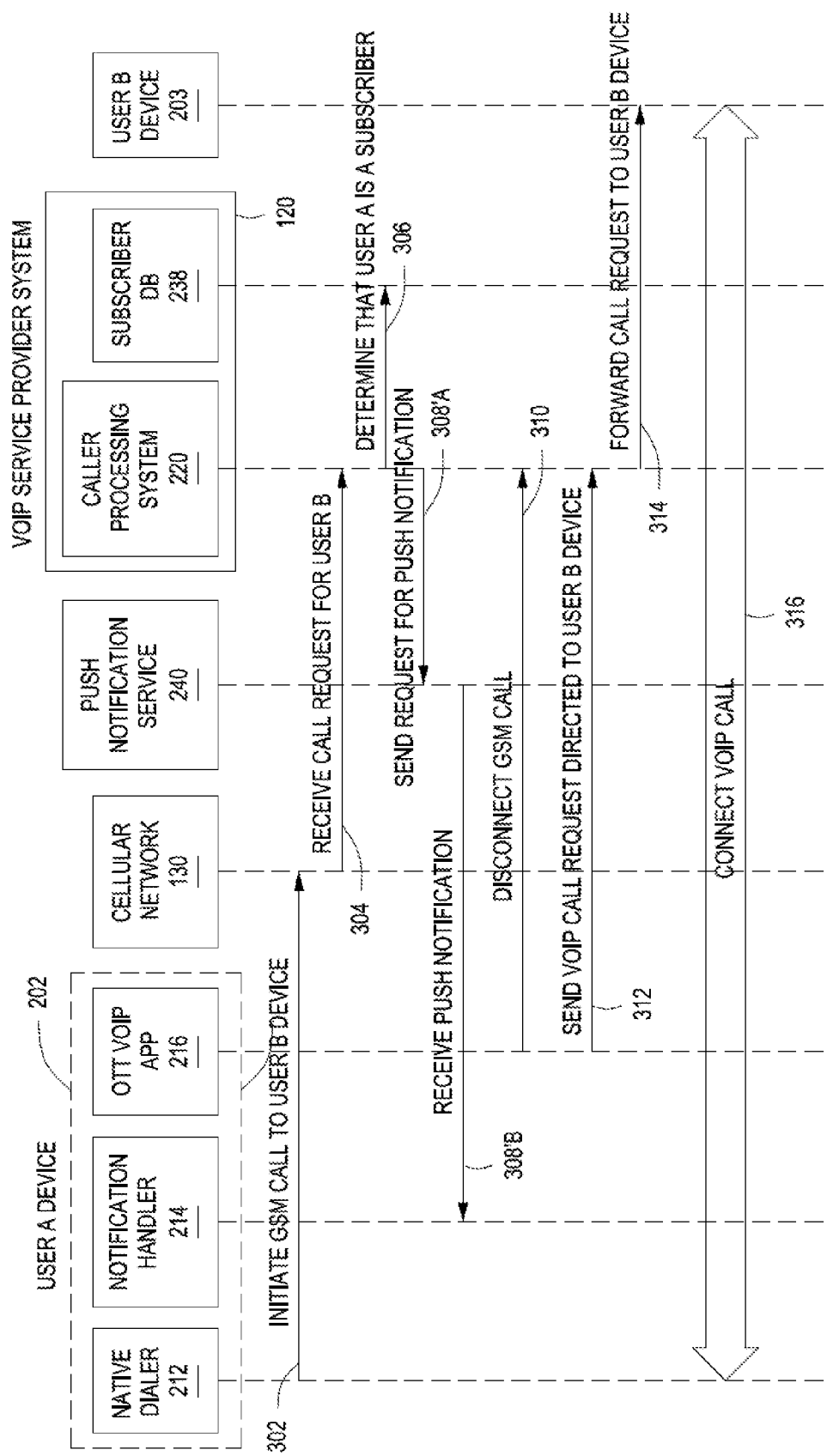

In other embodiments, the notification message may be a push notification message that is sent directly from the notification module 232 to user A device 202. Still in other embodiments, the notification message may be a request to an external Push Notification Service 240 for a push notification to be sent to user A device as shown by step 308'A as shown in FIG. 3B. In FIG. 3B, the external Push Notification Service 240 then sends the push notification to user A device at 308'B. Typically, push notifications enable a mobile application stored on a mobile device (e.g., OTT telecommunication module 216) to notify a user of new messages or events even when the user is not actively using the mobile application. When a device receives a push notification, the mobile application's icon and a message may appear in the status bar. When the user taps the notification, they are sent to the mobile application. Non-limiting examples of push notification services include: APPLE™ PUSH NOTIFICATION SERVICE from IOS 7.x (APNS7) and earlier, MICROSOFT™ PUSH NOTIFICATION SERVICE (MPNS), or GOOGLE™ CLOUD MESSAGING (GCM) service. New and improved push notification services provide interactive push notifications that provide additional functionality and support larger data payloads. For example, some may be interactive push notifications that may support packet data payloads of 2 kilobytes (kB)-4 kB or more (e.g., APPLE™ PUSH NOTIFICATION SERVICE in IOS 8.x (APNS8) and GCM).

In some embodiments, both a SIP message and a push notification may be sent to user A device 202. If both a push notification and direct SIP message are sent as the notification messages, the messages may be handled as described in U.S. Pat. No. 8,843,601, issued on Sep. 23, 2014, and titled "Systems and methods for VOIP communication completion to a mobile device", which is herein incorporated by reference in its entirety.

When user A's device 202 receives the notification message, user A's device 202 may process the notification message and display and/or play a notification on user A device 202 indicating that the call may be placed over the IP service provider network using the telecommunication module 216 (e.g., a VoIP mobile app). The notification displayed/played may include a badge displayed on display 205, an audible tone or message, a text pop-up box, accept/reject buttons, and the like.

In some embodiments, the notification handler 214 may process push notifications sent by notification module 232 or external push notification service 240 while the telecommunication module 216 handles SIP messages. In some embodiments, if the telecommunication module 216 is not running, or running in the background, it may need to be brought to the foreground or launched to register with the IP telephony system 120. The push notification is used to instruct user A device 202 to launch/open, at least partially, telecommunication module 216 causing telecommunication module 216 to send an SIP registration message to IP telephony system 120 user A device 202 if not already registered. In addition, in some embodiments, the notification handler 214 may display and/or play the notification on user A device 202 indicating that the call may be placed over the IP service provider network using the telecommunication module 216 (e.g., a VoIP mobile app).

If the telecommunication module 216 is already running with the notification message is received at 308, the telecommunication module 216 may process the notification message if the notification message in an SIP message. In this scenario, the telecommunication module 216 may display and/or play the notification on user A device 202 indicating that the call may be placed over the IP service provider network using the telecommunication module 216 (e.g., a VoIP mobile app).

If, when presented with the notification, the user rejects the invitation to establish the call over the IP service provider network using the telecommunication module 216, the cellular call is established via cellular provider 130. In some embodiments, an indication may be sent by user A device 202 to call processing system 220 indicating that the user rejected the invitation and that the cellular call should be established. In other embodiments, the cellular call may be established by default after a predetermined period of time if no indication is received.

If the user accepts the invitation to establish the call over the IP service provider network using the telecommunication module 216, a disconnect message is sent at 310 to terminate the original cellular call. In some embodiments, disconnecting or terminating the original cellular call means preventing the original cellular call from being established. The user may accept the invitation by selecting a graphical button displayed on the screen (e.g., a button, badge, etc.), pressing a key on a keypad, or simply by launching the telecommunication module 216 or bringing it to the foreground.

In some embodiments, user A may configure telecommunication module 216 to automatically redirect all cellular calls, without any user interaction, to be on-net if the notification message is received indicating that the call may be placed over the IP service provider network using the telecommunication module 216 (e.g., a VoIP mobile app). This automatic setting may be stored locally on user A's device or in user settings 236 maintained on the call processing system 220.

After the disconnect message is sent at 310, a call request is via telecommunication module 216 at 312. The call request may be a SIP INVITE message to establish an on-net call to user B device. At 314, the call request is forwarded to user B's device 203, and the call is established over the IP service provider network associated with IP telephony system 120 at 316.

Figure 4:
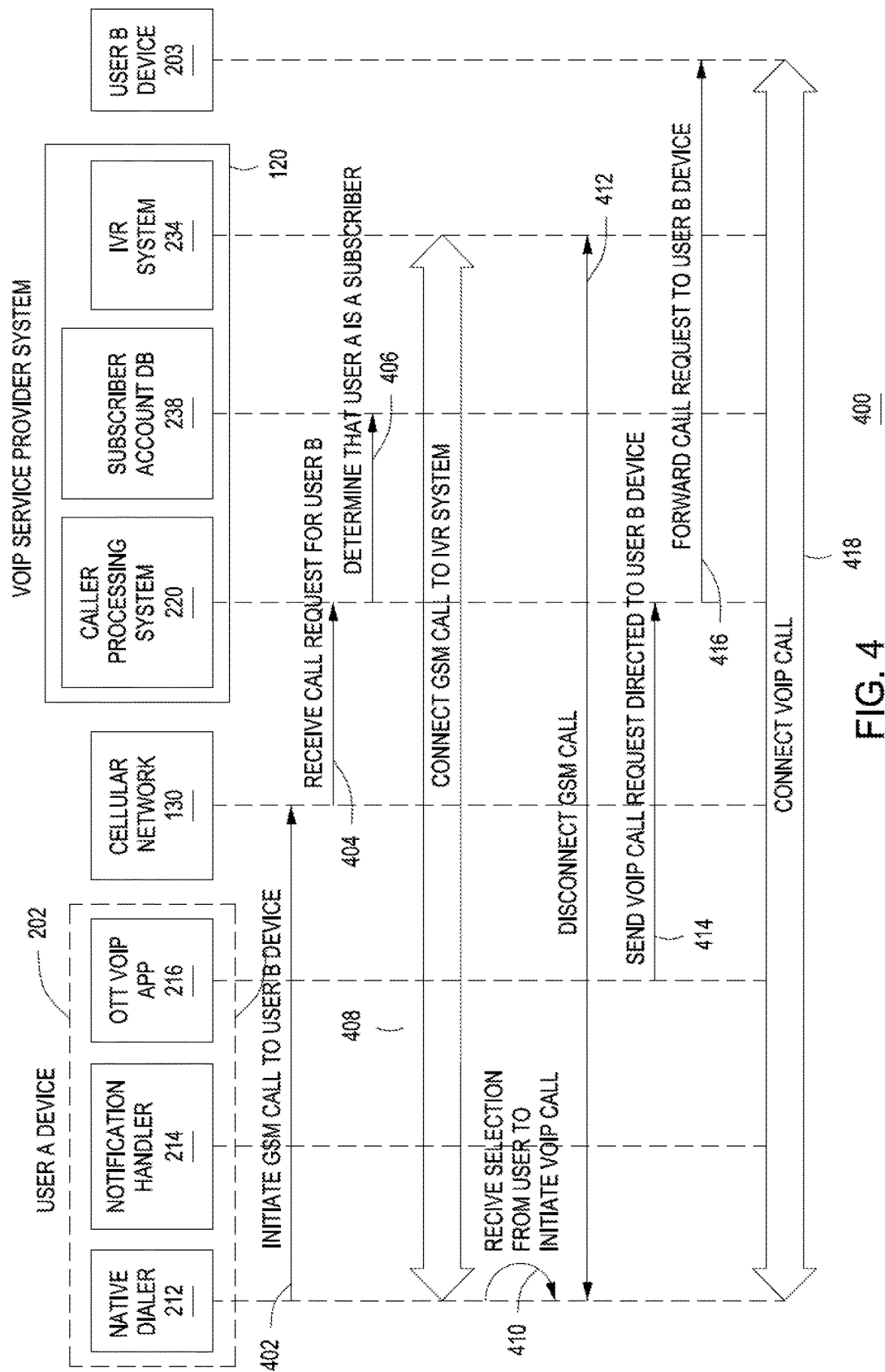
FIG. 4 is a flow diagram of an exemplary method for redirecting outgoing calls in accordance with one or more embodiments of the invention.

FIG. 4 depicts an alternate embodiment that uses an IVR system to notify user A that the call may be placed over the IP service provider network using the telecommunication module 216. Steps 402, 404 and 406 are similar to steps 302, 304 and 306, respectively, described above with respect to FIG. 3A.

However, if at 406 it is determined that user A is an IP telephony service subscriber associated with IP telephony system 120, a cellular (e.g., GSM) call is established between user A device 202 and IVR system 234. The IVR system notifies user A that the call may be placed over the IP service provider network using the telecommunication module 216 (e.g., a VoIP mobile app). The IVR system then prompts user A to either accept the redirection of the call over the IP telephony system 120 or reject the invitation to redirect the call.

If the user rejects the invitation to establish the call over the IP service provider network using the telecommunication module 216, the cellular call is established via cellular provider 130. In some embodiments, an indication may be sent by user A device 202 to call processing system 220 indicating that the user rejected the invitation and that the cellular call should be established. In other embodiments, the cellular call may be established by default after a predetermined period of time if no indication is received.

If at 410, the user accepts the invitation to establish the call over the IP service provider network using the telecommunication module 216, a disconnect message is sent at 412 to terminate the cellular call. The user may accept the invitation by speaking their selection to the IVR system, selecting a graphical button displayed on the screen (e.g., a button, badge, etc.), pressing a key on a keypad, or simply by launching the telecommunication module 216 or bringing it to the foreground.

After the disconnect message is sent at 412, a call request is via telecommunication module 216 at 414. The call request may be a SIP INVITE message to establish an on-net call to user B device. At 416, the call request is forwarded to user B's device 203, and the call is established over the IP service provider network associated with IP telephony system 120 at 418.

Figure 5:
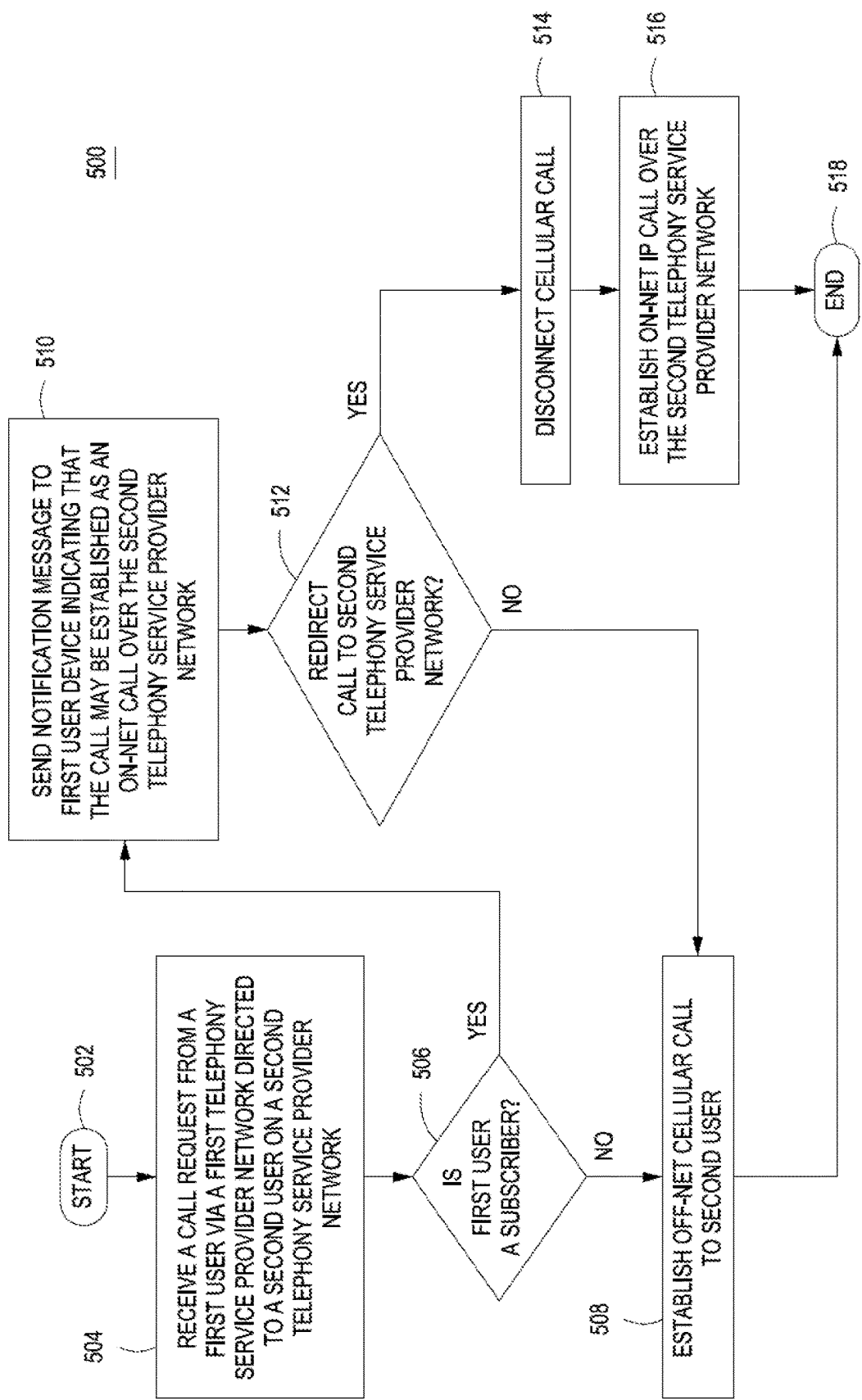
FIG. 5 is a flow diagram of an exemplary method for redirecting outgoing calls in accordance with one or more embodiments of the invention.

FIG. 5 is a flow diagram of an exemplary method 500 for redirecting outgoing calls in accordance with one or more embodiments of the invention. In some embodiments, the method 500 may be performed by call processing system 220. The method 500 begins at 502 and proceeds to 504 protocol request is received by call processing system 220 from a first user device (e.g., user A device) over a first telephony service provider network (e.g., cellular network 130). The call request may be directed to call processing system 220 via gateway 122. The call request from the first user is directed to a second user device (e.g., user B device) registered on, or otherwise associated with, a second telephony service provider network (e.g., IP telephony system 120).

At 506, it is determined whether the first user is a subscriber of the second telephony service provider network. As described above, this determination may be accomplished by extracting a communication identifier associated with the first user from the call request, and searching a subscriber database (e.g., subscriber database 238) using the communication identifier as a lookup key. That is, the subscriber database is searched to determine if the first user has a telephony service account and authorization to use the services of the second telephony service provider network.

If, at 506, the communication identifier is not found anywhere in subscriber database 238, or it is otherwise determined that the first user is not a subscriber of, or authorized to use, the second telephony service provider network, then the method 500 proceeds to 508 where the off-net cellular call is established to the second user.

If, at 506, it is determined that the first user is a subscriber of the second telephony service provider network, the method 500 proceeds to 510. At 510, a notification message is sent to the first user device indicating that the call may be established as an on-net call over the second telephony service provider network. In some embodiments, the notification message may be an SIP message and/or a push notification sent to the first user device. In other embodiments, the notification message may be a request to send a push notification which is sent to an external push notification server (e.g., external push notification service 240).

At 512, it is determined whether to redirect the call to the second telephony service provider network based on the response received from the first user device. In some embodiments, the response may be an indication from the first device rejecting the invitation to redirect the call to the second telephony service provider network. If the invitation is rejected, the method proceeds to 508 where the off-net cellular call to the second user is established in the method ends at 518. In some embodiments, the response may be a message to disconnect or terminate the original cellular call which indicates acceptance of the invitation to redirect the call over the second telephony service provider network. In other embodiments, the response may be an on-net call request sent over the second telephony service provider network that supersedes the off-net call request. In both cases, the cellular call is disconnected at 514. In some embodiments, disconnecting or terminating the original cellular call means preventing the original cellular call from being established between the first device and the second device. In some embodiments, disconnecting or terminating the call may include discarding or simply not processing the original call request. In other embodiments, disconnecting or terminating the call may including sending a disconnect/terminate message to cellular network 130 and/or the first device (e.g., user A device).

At 516, an on-net IP call is established over the second telephony service provider network between the first user and the second user after receiving an on-net call request from the first user sent over the second telephony service provider network. The method ends at 518.

Figure 6:
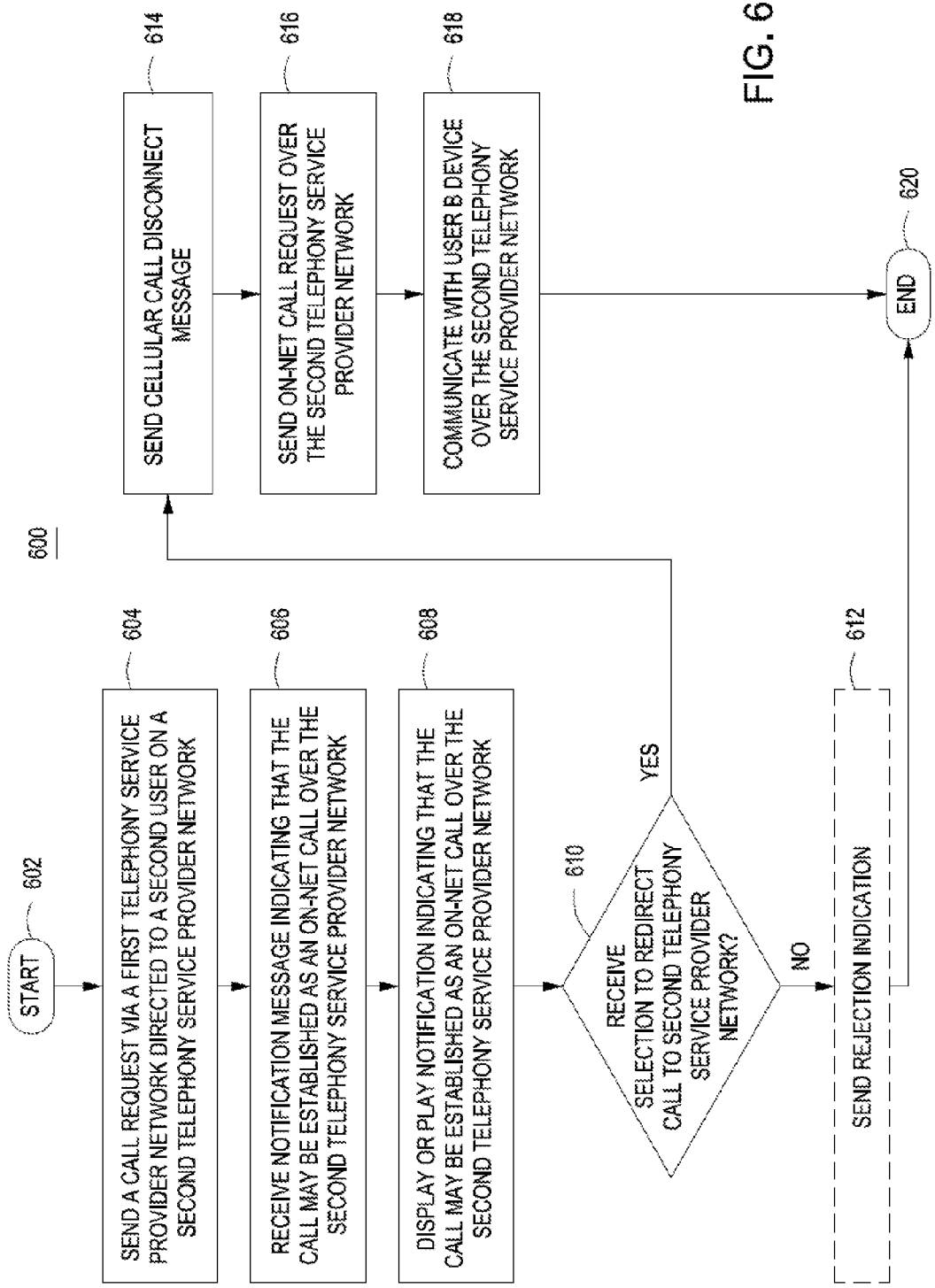
FIG. 6 is a flow diagram of an exemplary method for redirecting outgoing calls in accordance with one or more embodiments of the invention.

FIG. 6 is a flow diagram of an exemplary method 600 for redirecting outgoing calls in accordance with one or more embodiments of the invention. In some embodiments, the method 600 may be performed by a first user device (e.g., user A device). The method begins at 602 and proceeds to 604 were a call request is sent over a connection on a first telephony service provider network (e.g., cellular network 130). The cellular call request may be initiated by using a native dialer provided by the native telecommunication module 212 for example. Cellular call requests may be directed to a second user registered on a second telephony service provider network.

At 606, a notification message may be received indicating that the call may be established as an on-net call over the second telephony service provider network. At 608, a notification may be displayed or played indicating that the call may be established as an on-net call.

At 610, a selection is received indicating whether the invitation to redirect the call over the second telephony service provider network has been accepted or not. If the selection received indicates that the invitation to redirect the call was rejected, the method proceeds to 612 were a rejection indication may optionally be sent to the second telephony service provider network. If the selection received indicates that the invitation to redirect the call was accepted, the method proceeds to 614 where a cellular call disconnect message is sent. In some embodiments, instead of a cellular call disconnect message being sent, the method may proceed directly to step 616 where the on-net call request is sent over the second telephony service provider network.

At 618, the first user device may begin communicating with the second user device over the second telephony service provider network in and on-net call. The method ends at 620.

In some of the embodiments described above, calls are described as being originated from a native communication module/dialer (e.g., native telecommunication module 212) using a cellular network or a PSTN. However, in some embodiments, the call is not originated over a cellular network or using native communication module/dialer. For example, in some embodiments, a VoIP mobile app or a VoIP mobile extension app (i.e., a VoIP app that extends a user's home VoIP telephony service to their mobile device) connected to a first VoIP network may be used to initiate an off-net call over a cellular network, for example, to another device (e.g., user B device 203) located on a second VoIP network. In such cases, the call may go from a first VoIP network to a GSM network to a second VoIP network, for example. In this embodiment, the initial call request created by the VoIP mobile app or a VoIP mobile extension app will include a communication identifier of the originating calling device (e.g., user A device 202). The second VoIP service provider associated with the second VoIP network (e.g., IP telephony system 120) will use the communication identifier of user A device 202 to determine if user A device is a registered VoIP subscriber of their service and perform methods 300, 350, 400, and 500 to notify user A and redirect the call accordingly.

In some embodiments, the redirection of the call may be based on the callee's communication identifier. For example, user B registers their VoIP mobile app with a first VoIP service provider using their cellular communication identifier (e.g., their GSM number). User A uses a VoIP mobile extension app associated with the first VoIP service provider to call user B by dialing user B's GSM number. In this scenario, user A device will originate the call over the first VoIP network. The first VoIP service provider will look up user B's GSM number to determine if it is a subscriber of the first VoIP service provider. The first VoIP service provider will then send a notification to user A's device to notify user A that the call may be completed as an on-net call instead of an off-net call using the GSM network.

In alternative embodiments, a phone may include two or more subscriber identification module (SIM) cards, each SIM card being associated with a unique communication identifier and each SIM card being associated with different calling plans from first telephony service provider. Thus, a user device with multiple SIM cards makes a call using a first SIM card, the telephony service provider may be able to determine which SIM card and associated calling plan would provide the best (e.g., cheapest) rate. In this embodiment, the user of the device would be notified by the service provider as described above, and the call would be redirected using another SIM card accordingly.

In some embodiments, a user (e.g., user A) may register many different devices with the same telephony service account (e.g., devices 106, 108, 109, 136$_A$, 136$_B$, 202, etc.) of a telephony service provider (e.g., IP telephony system 120). When user A initiates a call from a first device (e.g., user A device 202) to user B device 203, the IP telephony system 120 would notify user A (e.g., via a notification message as describe above or via an IVR message) that the call could be completed as an on-net call via another on of user A's registered devices (e.g., TV 109). If user A accepts the invitation to transfer/redirect the call, the IP telephony system 120 would establish the call between user A's TV 109 and user B device 203.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 7:
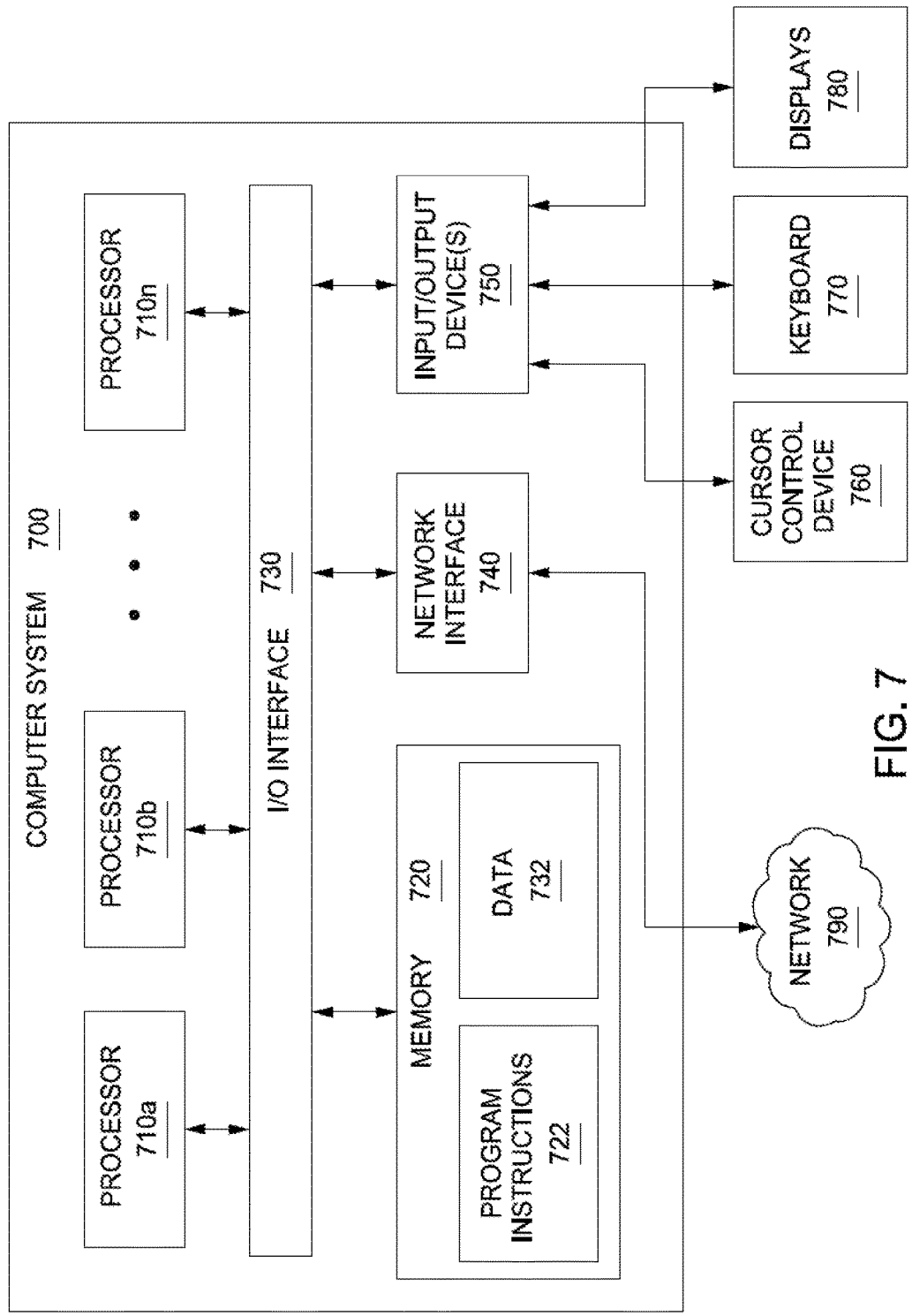
FIG. 7 is a depiction of a computer system that can be utilized in various embodiments of the present invention.

FIG. 7 depicts a computer system 700 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 700 illustrated by FIG. 7, which may in various embodiments implement any of the elements or functionality illustrated in FIGS. 1-6. In various embodiments, computer system 700 may be configured to implement methods described above. The computer system 700 may be used to implement any other system, device, element, functionality or method of the above-described embodiments. In the illustrated embodiments, computer system 700 may be configured to implement the methods 300, 350, 400, 500 and 600 as processor-executable executable program instructions 722 (e.g., program instructions executable by processor(s) 710) in various embodiments.

In the illustrated embodiment, computer system 700 includes one or more processors 710a-710n coupled to a system memory 720 via an input/output (I/O) interface 730. Computer system 700 further includes a network interface 740 coupled to I/O interface 730, and one or more input/output devices 750, such as cursor control device 760, keyboard 770, and display(s) 780. In various embodiments, any of the components may be utilized by the system to receive user input described above. In various embodiments, a user interface may be generated and displayed on display 780. In some cases, it is contemplated that embodiments may be implemented using a single instance of computer system 700, while in other embodiments multiple such systems, or multiple nodes making up computer system 700, may be configured to host different portions or instances of various embodiments. For example, in one embodiment some elements may be implemented via one or more nodes of computer system 700 that are distinct from those nodes implementing other elements. In another example, multiple nodes may implement computer system 700 in a distributed manner.

In different embodiments, computer system 700 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs). In multiprocessor systems, each of processors 710 may commonly, but not necessarily, implement the same ISA.

System memory 720 may be configured to store program instructions 722 and/or data 732 accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 720. In other embodiments, program instructions and/or data may be received, sent or stored upon different types of computer-accessible media or on similar media separate from system memory 720 or computer system 700.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (e.g., network 790), such as one or more external systems or between nodes of computer system 700. In various embodiments, network 790 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more computer systems 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

In some embodiments, the illustrated computer system may implement any of the operations and methods described above, such as the methods illustrated by the flowchart of FIGS. 3A-6. In other embodiments, different elements and data may be included.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

What is claimed is:

1. A computer-implemented method for redirecting a call, comprising:

receiving a first call request from a first user device via a first telephony service provider network to establish an off-net call with a second user device registered on a second telephony service provider network;

determining that the first user device is associated with an account of the second telephony service provider network based on a communication identifier of the first user device included in the first call request; and sending a notification massage to the first user device indicating that the off-net call is able to be established as an on-net call over the second telephony service provider network: wherein determining that a first user associated with the first user device is a subscriber of the second telephony service provider network includes: extracting the communication identifier of the first user device from the first call request; searching a subscriber database based on the communication identifier; and determining that the first user device is associated with a telephony service account with the second telephony service provider network.

2. The method of claim 1, further comprising:
receiving a second call request from the first user device to establish the on-net call with the second user device via the second telephony service provider network; and
establishing the on-net call between the first user device and the second user device over the second telephony service provider network.

3. The method of claim 2, wherein prior to establishing the on-net call between the first user device and the second user device over the second telephony service provider network, the off-net call initiated over the first telephony service provider network is disconnected.

4. The method of claim 2, wherein the off-net call initiated over the first telephony service provider network is disconnected upon receiving a disconnect message from the first user device responsive to the notification message.

5. The method of claim 2, wherein the off-net call initiated over the first telephony service provider network is disconnected upon receiving the second call request.

6. The method of claim 1, wherein the first telephony service provider network is one of a cellular network or a Public Switched Telephone Network (PSTN), and wherein the off-net call is one of a cellular call or a PSTN call.

7. The method of claim 6, wherein the second telephony service provider network is a Voice over Internet Protocol (VoIP) service provider network and the on-net call is a VoIP call.

8. The method of claim 1, wherein the notification message is a notification message sent directly to the first user device or a push notification request message sent to an external push notification service.

9. A computer-implemented method for redirecting an outgoing call, comprising:
sending, by a first user device, a first call request to establish an off-net call with a second user device, wherein the first call request includes communication identifiers of the first and second user devices;
receiving a notification message indicating that the off-net call is able to be established as an on-net call based on the communication identifiers of the first and second user devices; and
sending an on-net call request to establish the on-net call with the second user device; wherein determining that a first user associated with the first user device is a subscriber of the second telephony service provider network includes: extracting the communication identifier of the first user device from the first call request; searching a subscriber database based on the communication identifier; and determining that the first user device is associated with a telephony service account with the second telephony service provider network.

10. The method of claim 9, wherein the first and second user devices are registered on a first telephony service provider network, and wherein the first call request and the on-net call request are sent via the first telephony service provider network.

11. The method of claim 9, wherein the first call request is sent via a first telephony service provider network, wherein the second user device is registered on a second telephony service provider network, and wherein the on-net call request is sent over the second telephony service provider network.

12. The method of claim 11, wherein the first telephony service provider network is one of a cellular network or a Public Switched Telephone Network (PSTN), and wherein the first call request is initiated using a native telecommunication module to send the first call request over the cellular network or the PSTN.

13. The method of claim 12, wherein the second telephony service provider network is a Voice over Internet Protocol (VoIP) service provider network and the on-net call request is initiated using a VoIP app to send the on-net call request over the VoIP service provider network.

14. The method of claim 9, wherein prior to sending the on-net call request, the method further comprises:
displaying or playing, responsive to the received notification message, an indication that the off-net call is able to be established as an on-net call; and
receiving a selection to establish the on-net call.

15. The method of claim 9, wherein the notification message is a Session Initiation Protocol (SIP) message.

16. The method of claim 9, wherein the notification message is a push notification.

17. A system for redirecting a call, comprising:
a call processing system configured to receive a first call request from a first user device via a first telephony service provider network to establish an off-net call with a second user device registered on a second telephony service provider network;
a subscriber database that stores user account information;
a caller determination module communicatively coupled to the subscriber database and configured to determine whether the first user device is associated with an account of the second telephony service provider network based on a communication identifier of the first user device included in the first call request; and
a notification module configured to send a notification message to the first user device indicating that the off-net call is able to be established as an on-net call over the second telephony service provider network; wherein determining that a first user associated with the first user device is a subscriber of the second telephony service provider network includes: extracting the communication identifier of the first user device from the first call request; searching a subscriber database based on the communication identifier; and determining that the first user device is associated with a telephony service account with the second telephony service provider network.

18. The system of claim 17, wherein the call processing system is further configured to:
receive a second call request from the first user device to establish the on-net call with a second user device via second telephony service provider network; and
establish the on-net call between the first user device and the second user device over the second telephony service provider network.

19. The system of claim 18, wherein the first telephony service provider network is a cellular network and the off-net call is a cellular call.

20. The system of claim 19, wherein the second telephony service provider network is a Voice over Internet Protocol (VoIP) service provider network and the on-net call is a VoIP call.

* * * * *